US010620392B2

(12) United States Patent
Scherwin et al.

(10) Patent No.: US 10,620,392 B2
(45) Date of Patent: Apr. 14, 2020

(54) OPTICAL FIBER CABLE ASSEMBLY AND CARRIER

(71) Applicant: Molex, LLC, Lisle, IL (US)

(72) Inventors: Jerome Scherwin, Plainfield, IL (US); Loreta Sadauskas, Lemont, IL (US); Jesus Enrique Fung, Lisle, IL (US); Mark Waldron, Poplar Grove, IL (US); Thomas Schiltz, Naperville, IL (US); Gennady Genchanok, Buffalo Grove, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/300,322

(22) PCT Filed: May 10, 2017

(86) PCT No.: PCT/US2017/031874
§ 371 (c)(1),
(2) Date: Nov. 9, 2018

(87) PCT Pub. No.: WO2017/196920
PCT Pub. Date: Nov. 16, 2017

(65) Prior Publication Data
US 2019/0154935 A1    May 23, 2019

Related U.S. Application Data

(60) Provisional application No. 62/334,226, filed on May 10, 2016.

(51) Int. Cl.
*G02B 6/44* (2006.01)
*G02B 6/38* (2006.01)
*G02B 6/43* (2006.01)

(52) U.S. Cl.
CPC ......... *G02B 6/4403* (2013.01); *G02B 6/3885* (2013.01); *G02B 6/43* (2013.01);
(Continued)

(58) Field of Classification Search
CPC ................................................. G02B 6/4403
(Continued)

(56) References Cited

U.S. PATENT DOCUMENTS 5,559,913 A   9/1996 Lerminiaux
6,584,270 B2  6/2003 Kashihara et al.
(Continued)

FOREIGN PATENT DOCUMENTS

CN    1771449 A    5/2006
CN    1774657 A    5/2006
(Continued)

OTHER PUBLICATIONS

International Search Report and Written Opinion received for PCT application No. PCT/US2017/031874, dated Jul. 23, 2017, 14 pages.
(Continued)

*Primary Examiner* — Sung H Pak
(74) *Attorney, Agent, or Firm* — Molex, LLC

(57) ABSTRACT

An optical fiber cable assembly has a first end portion of each of a plurality of optical fibers positioned in a generally parallel first array and a second end portion of each of the plurality of optical fibers is positioned in a generally parallel second array. Optical fibers along a portion of the length spaced from the first and second end portions are not retained in a parallel array. A coating is applied to at least a section of each optical fiber. A generally planar carrier of an optical assembly has a first guide member and a second guide member with a first cable assembly disposed within the first guide member and a second cable assembly dis-
(Continued)

posed within the second guide member. Connectors of the cable assemblies are spaced from the carrier. A securement structure retains the cable assemblies within the guide members.

16 Claims, 20 Drawing Sheets

(52) U.S. Cl.
CPC ............. *G02B 6/44* (2013.01); *G02B 6/4459* (2013.01); *G02B 6/4463* (2013.01); *G02B 6/4471* (2013.01)

(58) Field of Classification Search
USPC .......................................................... 385/114
See application file for complete search history.

(56) References Cited

U.S. PATENT DOCUMENTS

| | | | |
|---|---|---|---|
| 6,678,456 | B2 | 1/2004 | Moghadam |
| 6,721,042 | B1 | 4/2004 | Sun et al. |
| 8,891,912 | B2 | 11/2014 | Trotabas et al. |
| 9,946,045 | B2 * | 4/2018 | Kegerise ............... G02B 6/4452 |
| 2001/0036350 | A1 | 11/2001 | Kashihara et al. |
| 2014/0314385 | A1 * | 10/2014 | Miller .................. G02B 6/4452 385/135 |
| 2014/0363125 | A1 | 12/2014 | Schwarzenbach et al. |
| 2015/0346445 | A1 * | 12/2015 | Blazer .................. G02B 6/4403 385/114 |

FOREIGN PATENT DOCUMENTS

| | | |
|---|---|---|
| CN | 201828694 U | 5/2011 |
| CN | 203422509 U | 2/2014 |
| CN | 102375191 B | 4/2015 |
| JP | H06-034831 A | 2/1994 |
| JP | 2000-227532 A | 8/2000 |
| JP | 2005-114830 A | 4/2005 |
| WO | 2017/196920 A2 | 11/2017 |

OTHER PUBLICATIONS

International Preliminary Report on Patentability received for PCT Application No. PCT/US2017/031874, dated Nov. 22, 2018, 12 pages.
Notification of Reasons for refusal received for Japanese patent application No. 2018-553198, dated Nov. 5, 2019, 8 pages. (4 pages of English translation and 4 pages of official copy).

* cited by examiner

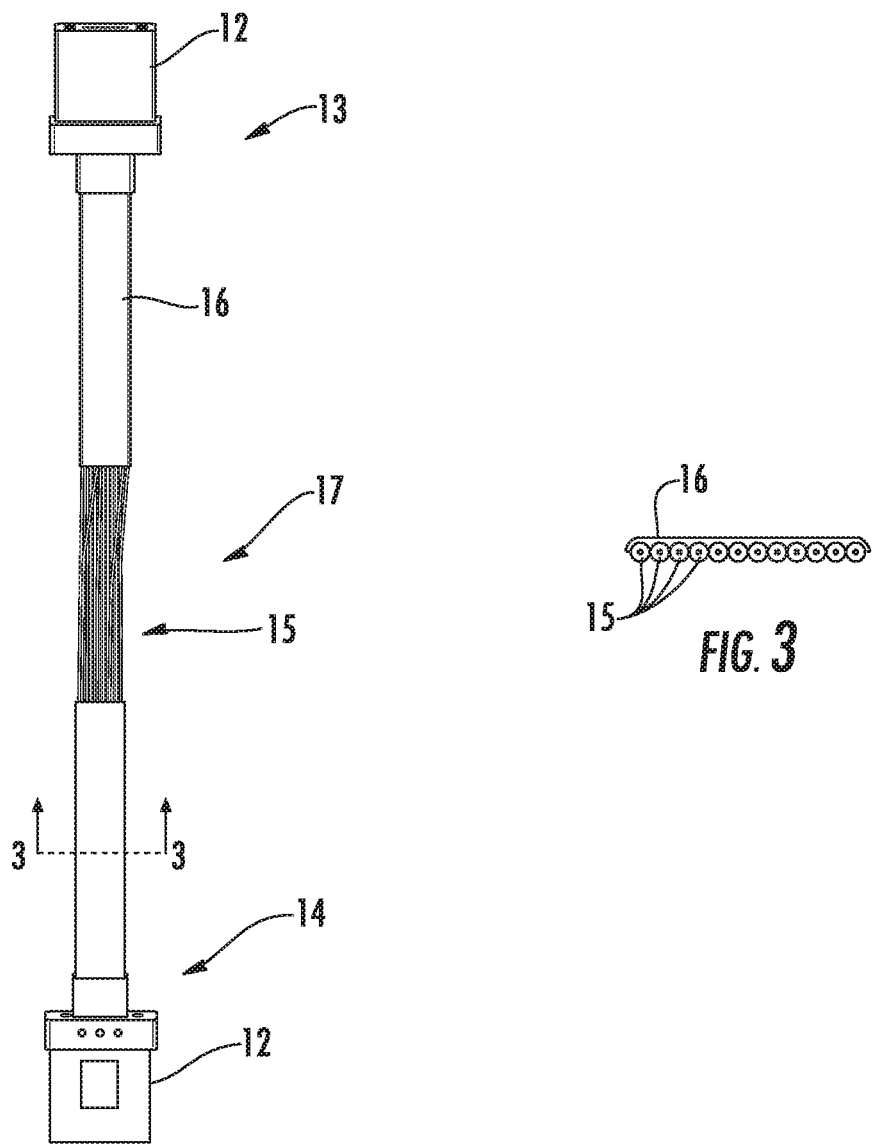

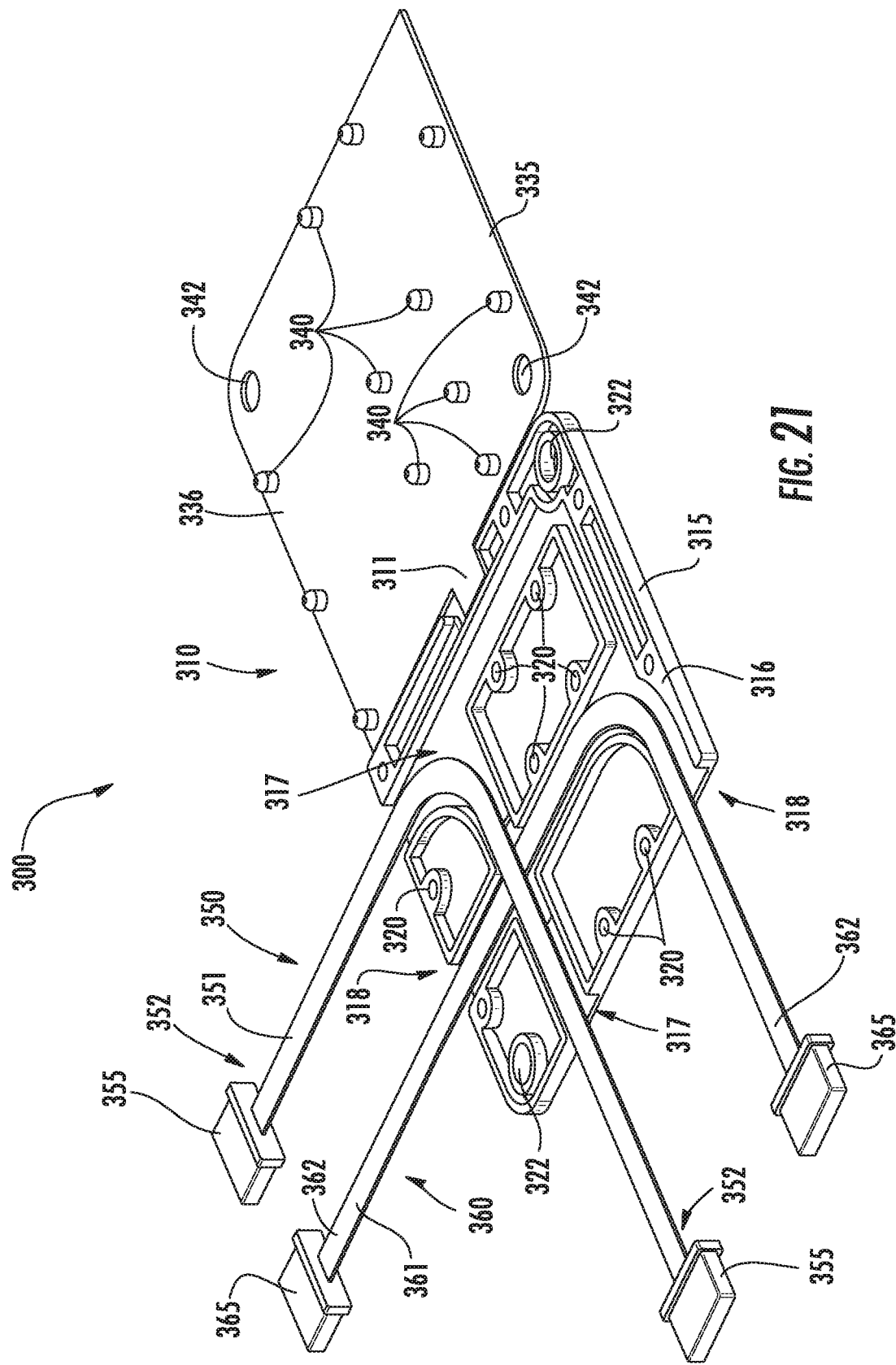

OPTICAL FIBER CABLE ASSEMBLY AND CARRIER

RELATED APPLICATIONS

This application is a national stage of International Application No. PCT/US2017/031874, filed May 10, 2017, which claims priority to U.S. Application No. 62/334,226, filed May 10, 2016, both of which are incorporated herein by reference in their entirety.

TECHNICAL FIELD

The present disclosure relates generally to optical assemblies and, more particularly, to optical fiber cable assemblies and carriers for positioning and supporting optical fiber cable assemblies during an assembly process.

BACKGROUND

Optical fiber cable assemblies are sometimes formed by laying a plurality of individual optical fibers on a substrate and coating the optical fibers with a conformal coating. Such so-called ribbon cables may be used to route the optical fibers along a path from a first optical fiber connector to a second optical fiber connector. U.S. Pat. No. 8,891,912 discloses examples of optical fiber cable assemblies incorporating such ribbon cables and their method of manufacture.

Handling optical fiber cable assemblies after they are manufactured and during the process of positioning the cable assemblies within an optical-electronic system is sometimes challenging or problematic. The flexibility of the ribbon cables and the desire to interleave the ribbon cables may increase the difficulty during the handling and system assembly process. In some applications, it may also be desirable to provide additional protection for the optical fibers that form the ribbon cables.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, an optical fiber cable assembly includes a plurality of optical fibers each having a length and with each optical fiber having a first end portion and a second end portion. The first end portion of each of the plurality of optical fibers is positioned in a generally parallel first array and the second end portion of each of the plurality of optical fibers is positioned in a generally parallel second array. A coating is applied to at least a section of each optical fiber and the optical fibers along a portion of the length spaced from the first and second end portions are not retained in a parallel array.

In another aspect, an optical fiber assembly includes a first cable assembly, a second cable assembly and a generally planar carrier. The first cable assembly has a plurality of first optical fibers with a plurality of first optical fiber connectors terminated to the plurality of first optical fibers. The second cable assembly has a plurality of second optical fibers with a plurality of second optical fiber connectors terminated to the plurality of second optical fibers. The carrier has at least one first guide member and at least one second guide member. The first cable assembly is secured to the carrier with a portion of the first cable assembly disposed within the at least one first guide member and the plurality of first optical fiber connectors being spaced from the carrier. The second cable assembly is secured to the carrier with a portion of the second cable assembly disposed within the at least one second guide member and the plurality of second optical fiber connectors being spaced from the carrier. A securement structure is operatively associated with each first guide member and each second guide member and is operative to retain the portion of the first cable assembly within the first guide member and retain the portion of the second cable assembly within the second guide member.

BRIEF DESCRIPTION OF THE DRAWINGS

FIG. 2 is a top plan view of the optical fiber cable assembly of FIG. 1 with a portion of its coating removed;

FIG. 3 is an enlarged sectional view taken generally along the line 3-3 of FIG. 1;

FIG. 21 is a perspective view of a third embodiment of an optical fiber assembly with the carrier in an open or loading position.

DETAILED DESCRIPTION

Figure 1:
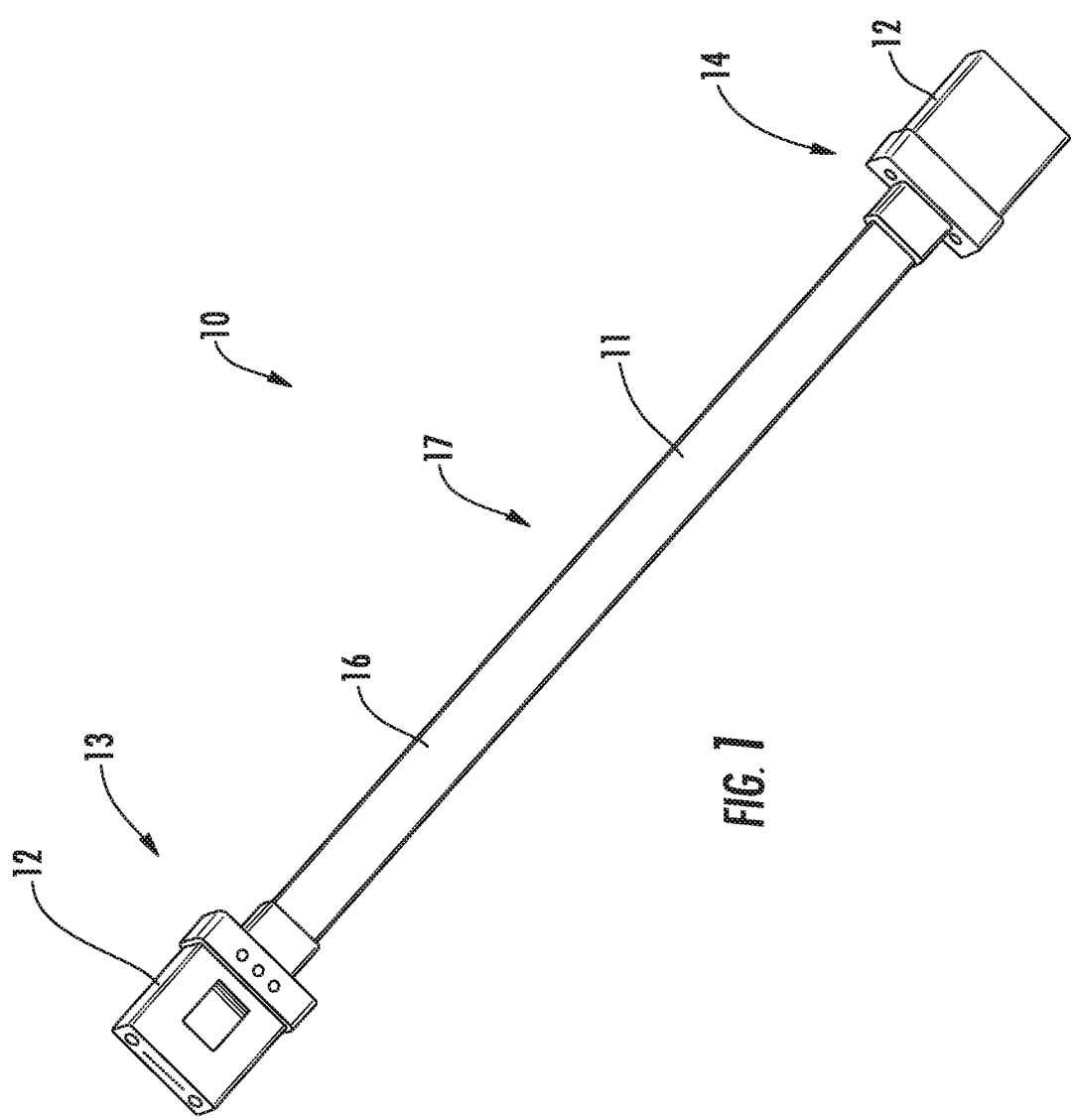
FIG. 1 is a perspective view of an optical fiber cable assembly.

Referring to FIGS. 1-3, an optical fiber cable assembly 10 includes a generally planar ribbon cable 11 with an optical fiber connector 12 terminated at each of a first end 13 and a second, opposite end 14. The ribbon cable 11 includes a plurality of optical fibers 15 (FIGS. 2-3) that are generally positioned in a side-by-side array to form a generally planar structure. The optical fibers 15 are at least partially encapsulated by a coating 16, such as a silicone or polymer material, to secure the optical fibers in their desired positions while maintaining a desired degree of flexibility to the ribbon cable 11. The ribbon cable 11 includes a crossover or "shuffle" section 17 (visible in FIG. 2) due to the removal of a length of the coating 16) at which some of the optical fibers 15 crossover each other to change the order or sequence of the optical fibers 15 between the first and second ends 13, 14 of the ribbon cable. As a result of the crossover section 17, the sequence of optical fibers 15 at the first end 13 does not match the sequence of optical fibers at the second end 14 (e.g., the fiber in position 1 at the first end may be at position 5 at the second end, etc.).

Figure 4:
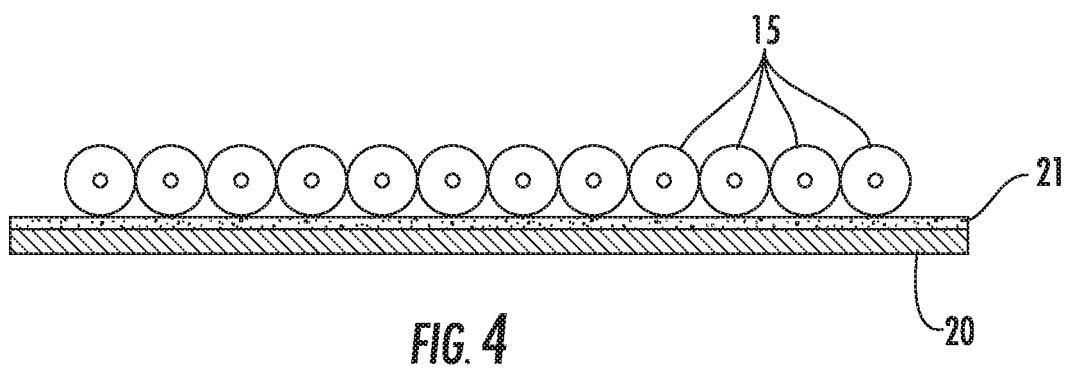
FIG. 4 is a diagrammatic cross-sectional view of a plurality of optical fibers positioned on a substrate as part of the process of manufacturing the optical fiber cable assembly of FIG. 1.
Figure 5:
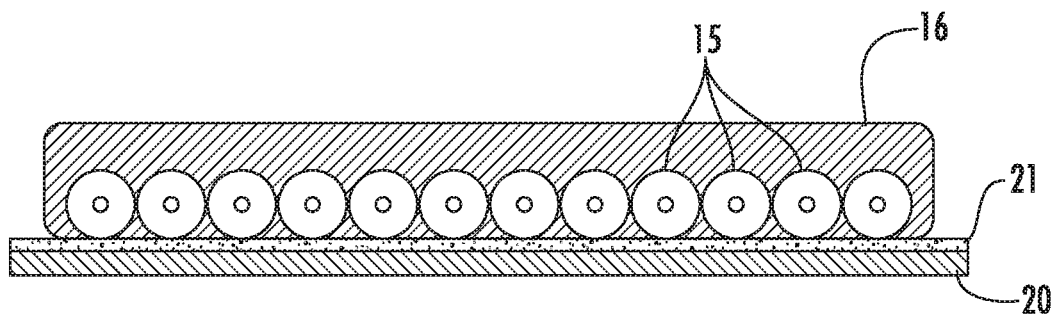
FIG. 5 is a diagrammatic cross-sectional view similar to that of FIG. 4 but with a coating applied to the optical fibers.
Figure 6:
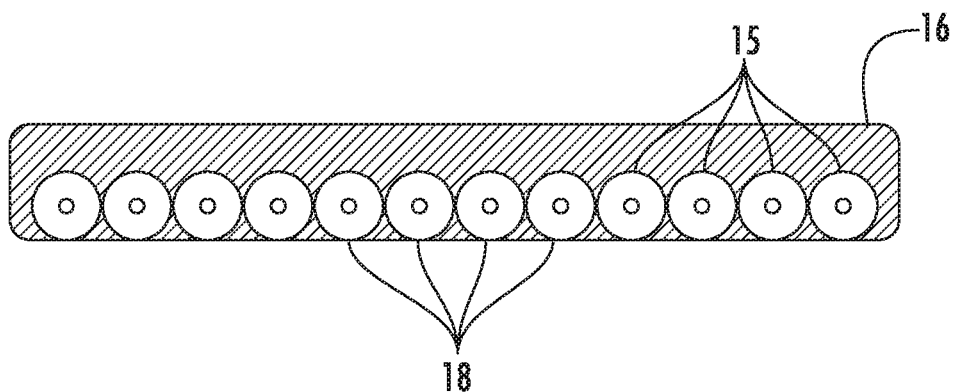
FIG. 6 is a diagrammatic cross-sectional view similar to that of the FIG. 5 but with the substrate removed.

In one embodiment, to form the ribbon cable 11, a substrate 20 with a layer of adhesive 21 thereon may be provided. A plurality of the optical fibers 15 may be applied or positioned on the adhesive in a desired pattern such as a side-by-side array together with the crossover section 17 (FIG. 4). The optical fibers 15 may then be at least partially coated or encapsulated by the coating 16 (FIG. 5). The ribbon cable 11 may be removed from the substrate 20 and the portions 18 of the optical fibers 15 that contact the adhesive 21 will not be coated with the coating. If it is desired to fully encapsulate the optical fibers 15, the coating 16 may be subsequently applied to the portions 18 of the optical fibers 15 that were in contact with the adhesive 21.

The coating 16 may be formed in any desired manner and from any desired material. In one example, the coating may be a conformal coating formed of a polymer, resin, or another material. In another example, the coating may be applied by overmolding or attached as a tape. Regardless of its form and application, the coating 16 is applied to at least a portion of each optical fiber 15.

After forming the ribbon cable 11, the optical fiber connectors 12 may be terminated to the optical fibers 15 of the ribbon cable in a conventional manner.

Figure 7:
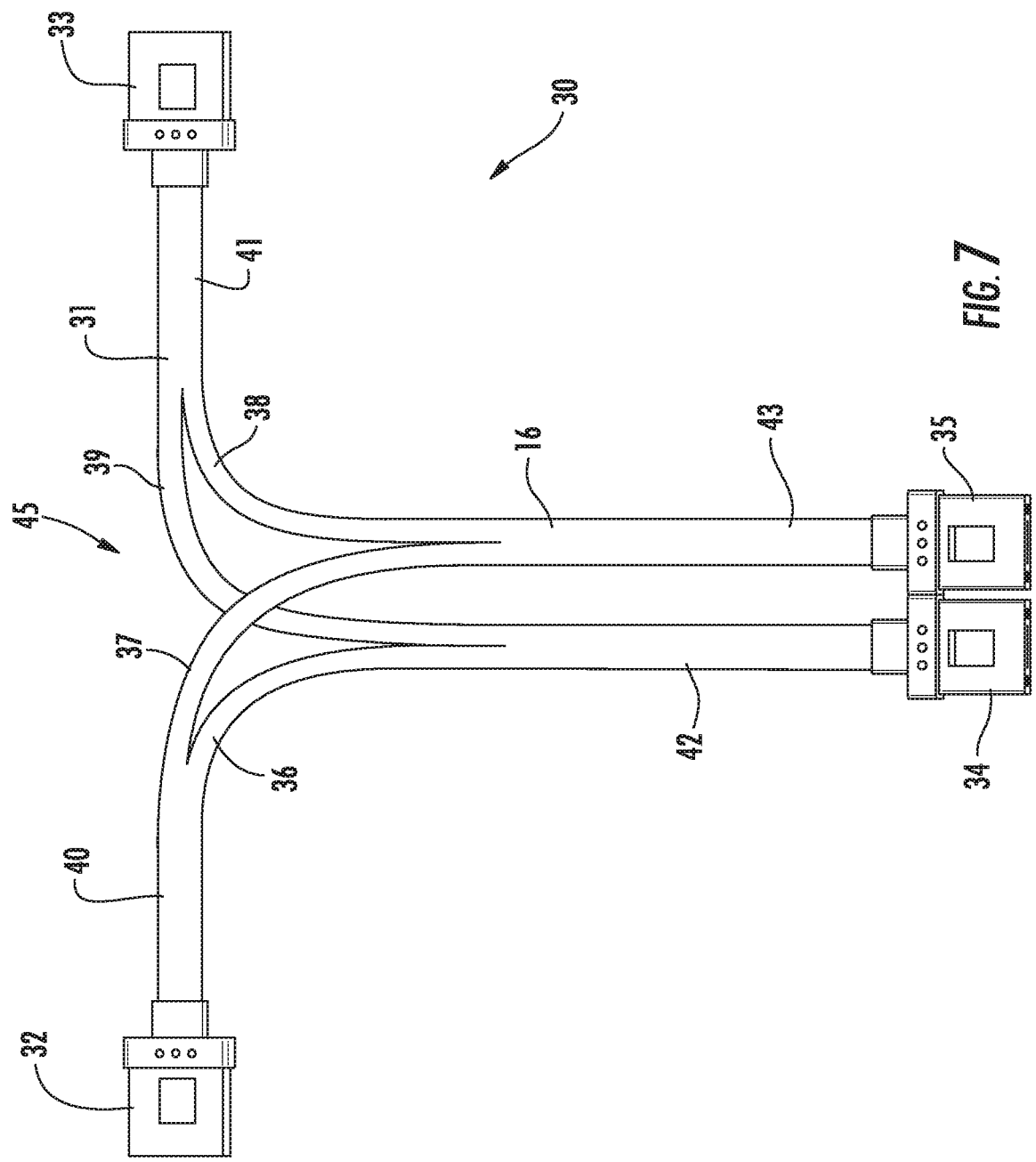
FIG. 7 is a top plan view of a 2nd embodiment of an optical fiber cable assembly.
Figure 8:
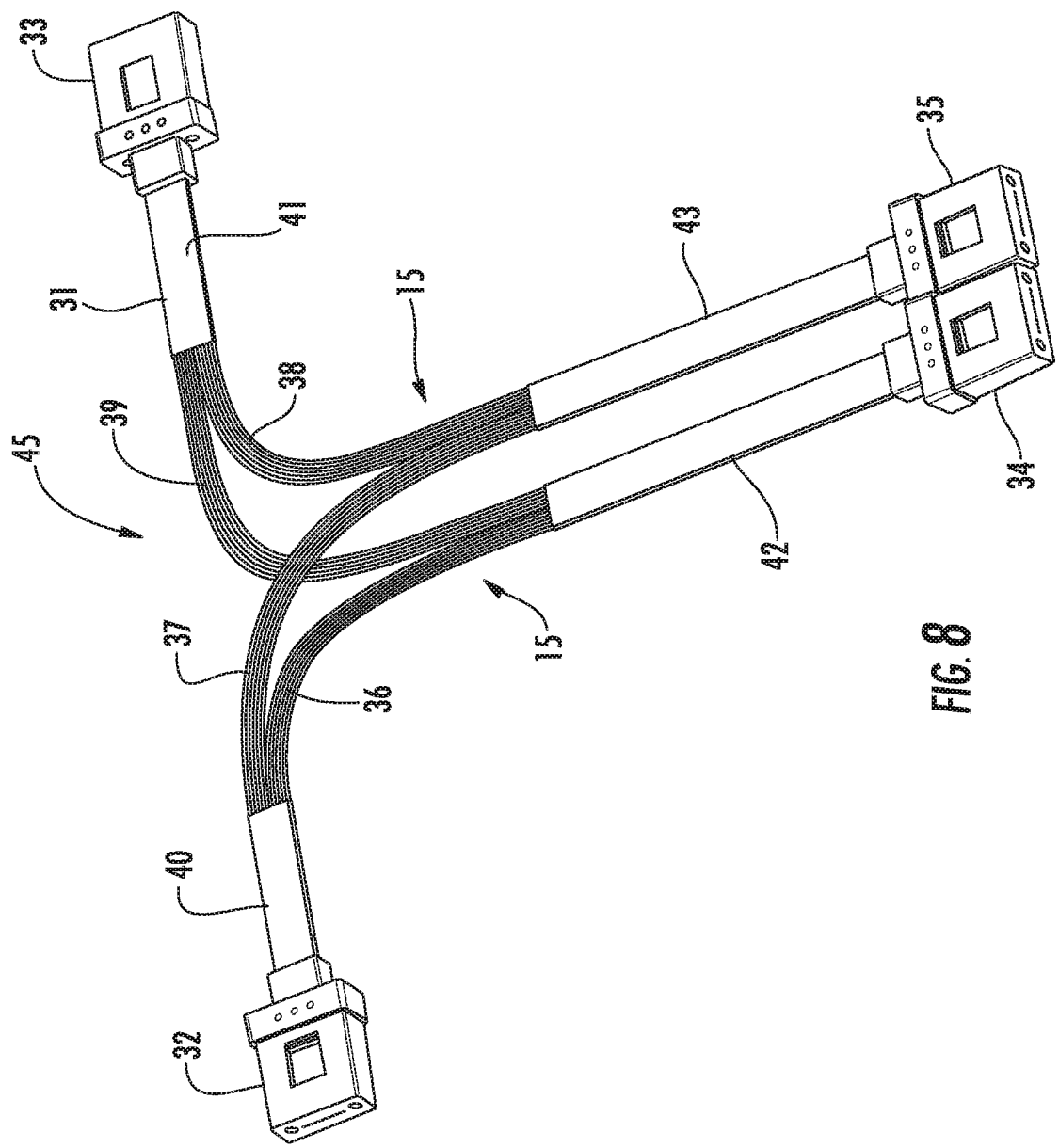
FIG. 8 is a perspective view of the optical fiber cable assembly of FIG. 7 with a portion of its coating removed.

Referring to FIGS. 7-8, a second embodiment of an optical fiber cable assembly 30 includes a ribbon cable 31 terminated to first, second, third, and fourth optical fiber connectors 32-35. The optical fiber cable assembly 30 may be formed in the same manner as the optical fiber cable assembly 10 but with the optical fibers 15 laid in a different pattern. More specifically, a substrate 20 with an adhesive 21 thereon may be provided and the optical fibers 15 applied to the adhesive in a desired pattern. Such desired pattern includes the first, second, third, and fourth groups 36-39 of optical fibers 15 that are interleaved or crossed over. A portion of the first and second groups 36-37 form a length 40 of optical fibers 15 that are terminated to the first optical fiber connector 32, a portion of the third and fourth groups 38-39 form a length 41 of optical fibers that are terminated to the second optical fiber connector 33, a portion of the first and fourth groups 36, 39 form a length 42 of optical fibers that are terminated to the third optical fiber connector 34, and a portion of the second and third groups 37-38 form a length 43 of optical fibers that are terminated to the fourth optical fiber connector 35. Such a configuration creates a crossover section 45 at which the optical fibers 15 of the second group 37 crossover the optical fibers of the fourth group 39. A coating 16 may be applied to the optical fibers 15 and the optical fibers removed from the substrate 20 to form the ribbon cable 31. The optical fiber connectors 32-35 may be terminated to the optical fibers 15 in a conventional manner.

Figure 9:
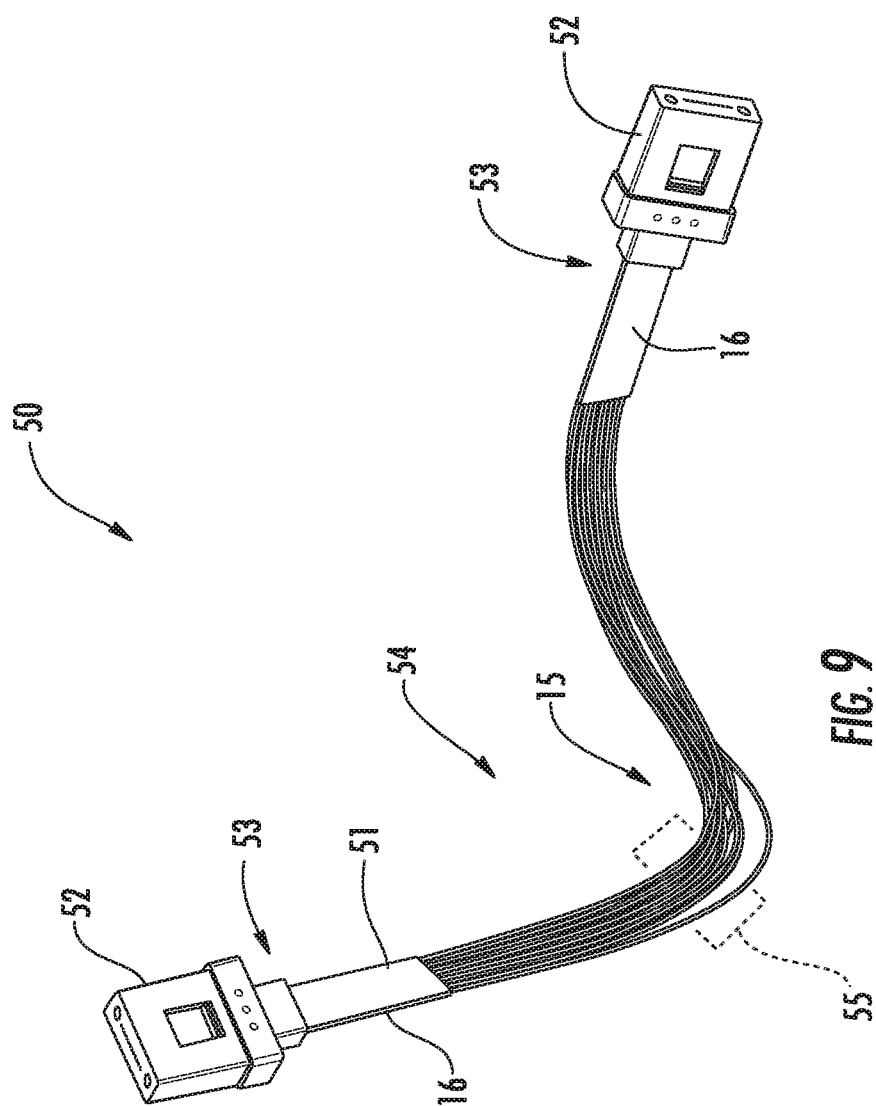
FIG. 9 is a perspective view of a third embodiment of an optical fiber cable assembly.

In some instances, the ribbon cable may not be sufficiently flexible to permit routing of an optical fiber cable assembly within a desired environment such as an opto-electronic enclosure (not shown). For example, the enclosure in which the optical fiber cable assembly is used may include a circuit board with the various components mounted thereon and around which the cable assembly must be routed. Such a routing process may be challenging even though the optical fiber cable assembly has some degree of flexibility. FIG. 9 depicts an optical fiber cable assembly 50 having a partial or mixed ribbon cable 51 terminated to first and second optical fiber connectors 52 at opposite ends 53 of the partial ribbon cable. Such partial ribbon cable 51 may include one or more segments or portions 54 thereof spaced from the ends 53 that do not include the coating 16 while the ends include the coating to maintain the optical fibers 15 in their desired positions to assist in terminating the optical fibers.

By eliminating the coating 16 along a segment or portion 54 of the optical fibers 15, the flexibility of the partial ribbon cable 51 may be increased to assist in routing the cable assembly 50. Depending upon the length of the optical fiber cable assembly 50 and the desired application, additional segments such as the one shown in phantom at 55 between the ends 53 of the partial ribbon cable 51 may be formed with the coating 16 to assist in maintaining the position and form of the cable assembly 50.

The optical fiber cable assembly 50 may be formed in the same manner as the optical fiber cable assemblies 10, 30 with the optical fibers 15 laid in a desired pattern on a substrate 20 with an adhesive 21 thereon. A coating 16 may be applied to the optical fibers 15 at desired locations or along desired segments and the optical fibers removed from the substrate 20 to form the partial ribbon cable 51. The optical fiber connectors 52 may be terminated to the optical fibers 15 in a conventional manner at ends 53 of the partial ribbon cable 51.

Figures 9A, 9C:
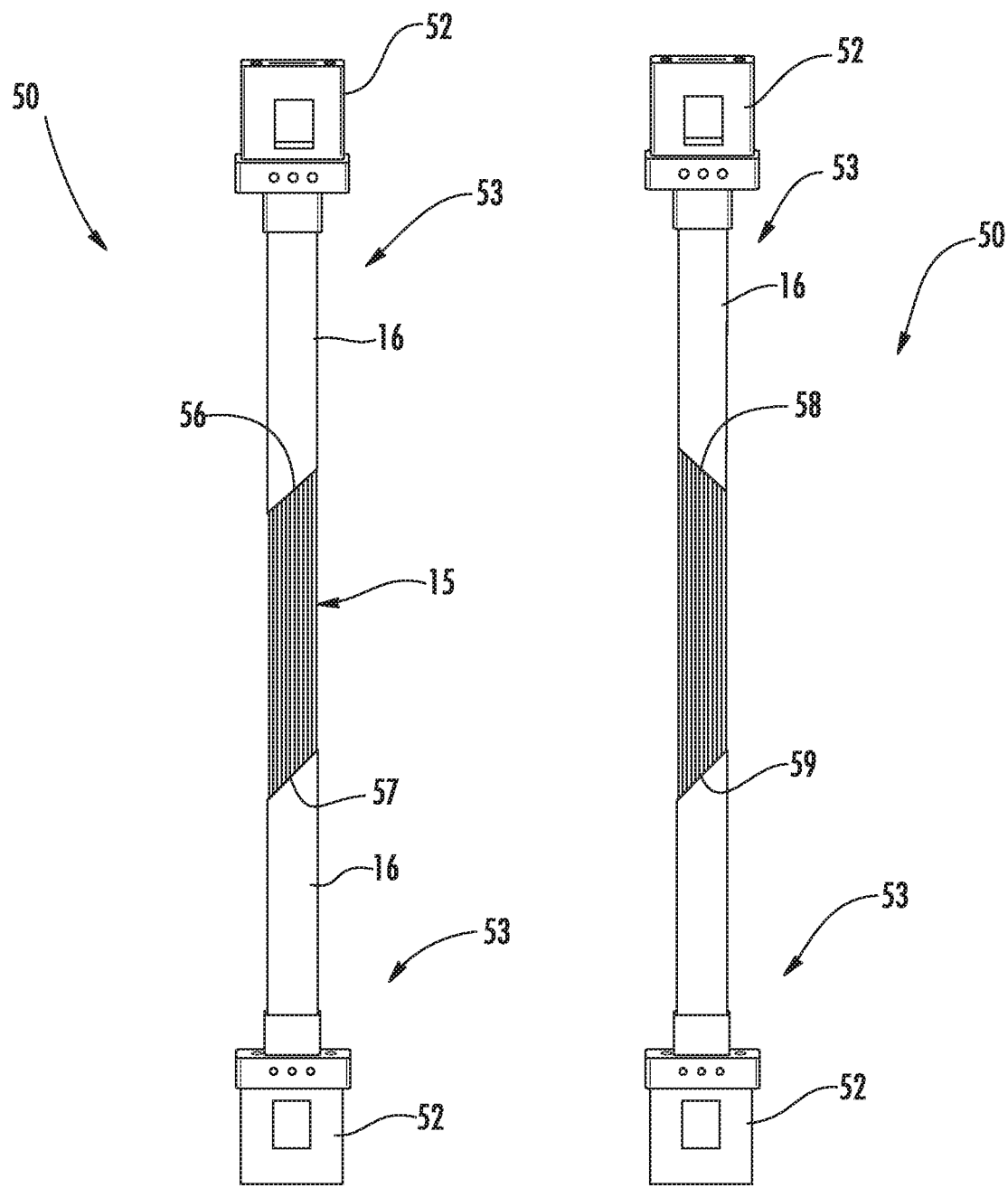
FIG. 9a is perspective view of a fourth embodiment of an optical fiber cable assembly similar to that of FIG. 9 but with the coating having angle edges.
FIG. 9c is perspective view of a fifth embodiment of an optical fiber cable assembly similar to that of FIG. 9a but with one of the angle edges of the coating angled in an opposite direction.
Figure 9B:
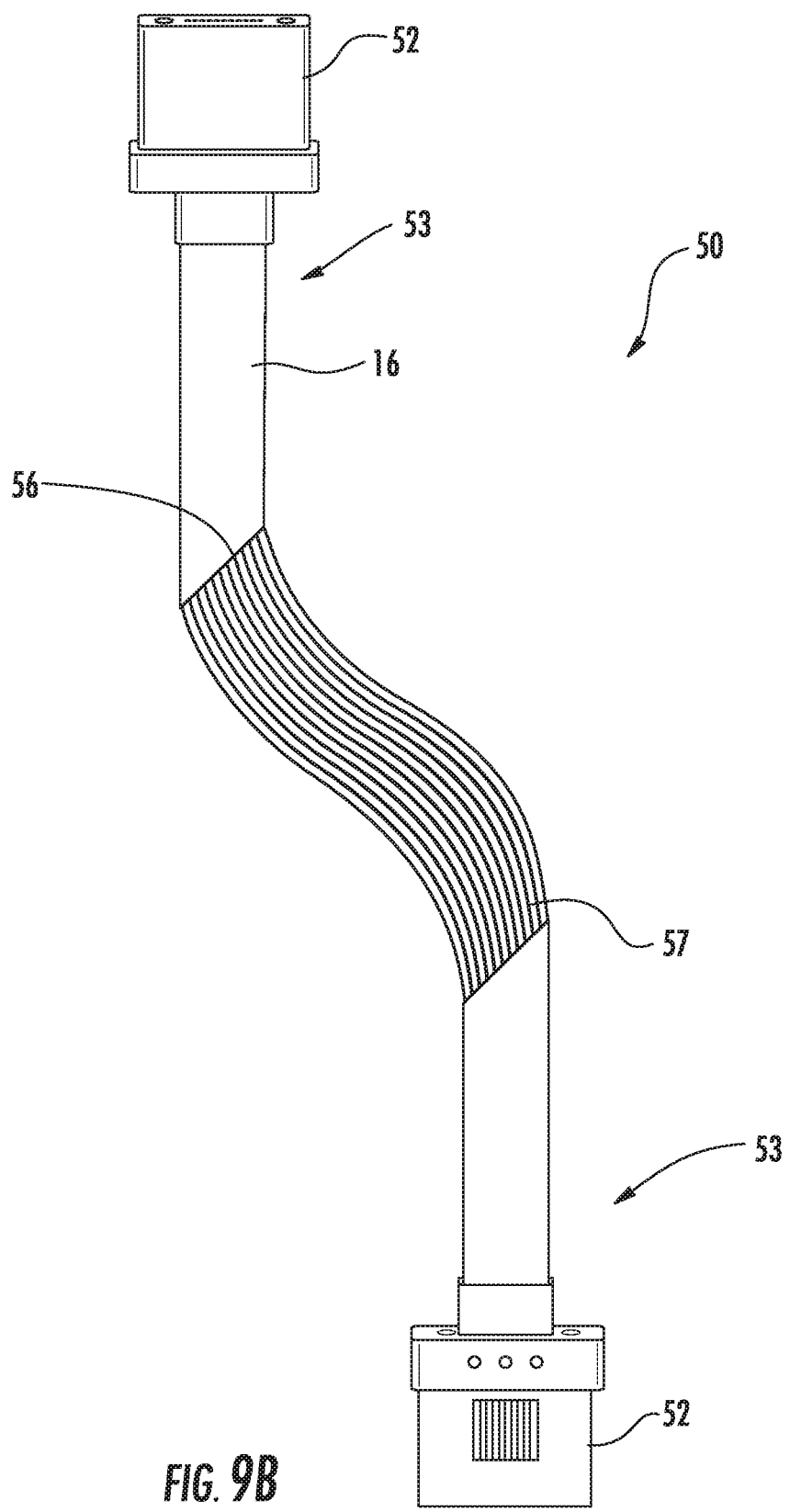
FIG. 9b is perspective view of the optical fiber cable assembly of FIG. 9a but with the optical fibers bent along their uncoated surfaces.

Referring to FIGS. 9a-9b, edges 56, 57 of the coating 16 may be angled relative to the axes of the optical fibers 15 (i.e., not at 90 degrees to the axes). The angled edges 56, 57 of the coating 16 may assist in guiding the optical fibers 15 in desired directions of bending. As depicted in FIGS. 9a-9b, the angled edges 56, 57 of the coating 16 are angled in the same direction and at the same angle (i.e., approximately 45 degrees) relative to the axes of the optical fibers 15 so that the angled edges are generally parallel to each other (when the optical fibers are linear). In other words, prior to installing the cable assembly 50, the angled edges 56, 57 of the end portions 53 are generally parallel as depicted in FIG. 9a. Once the cable assembly 50 is installed, the angled edges 56, 57 may no longer be generally parallel.

Depending upon the desired application and bend of the optical fibers 15, other angles and configurations may be used and the angles may not be identical. In another embodiment, the angled edges 56, 57 may be formed with the angles between approximately 30 degrees and 60 degrees relative to the axes of the optical fibers 15. In a further embodiment, as depicted in FIG. 9c, the angled edges 58, 59 of the coating 16 may be tapered in opposite directions rather than tapering in the same direction.

Figure 10:
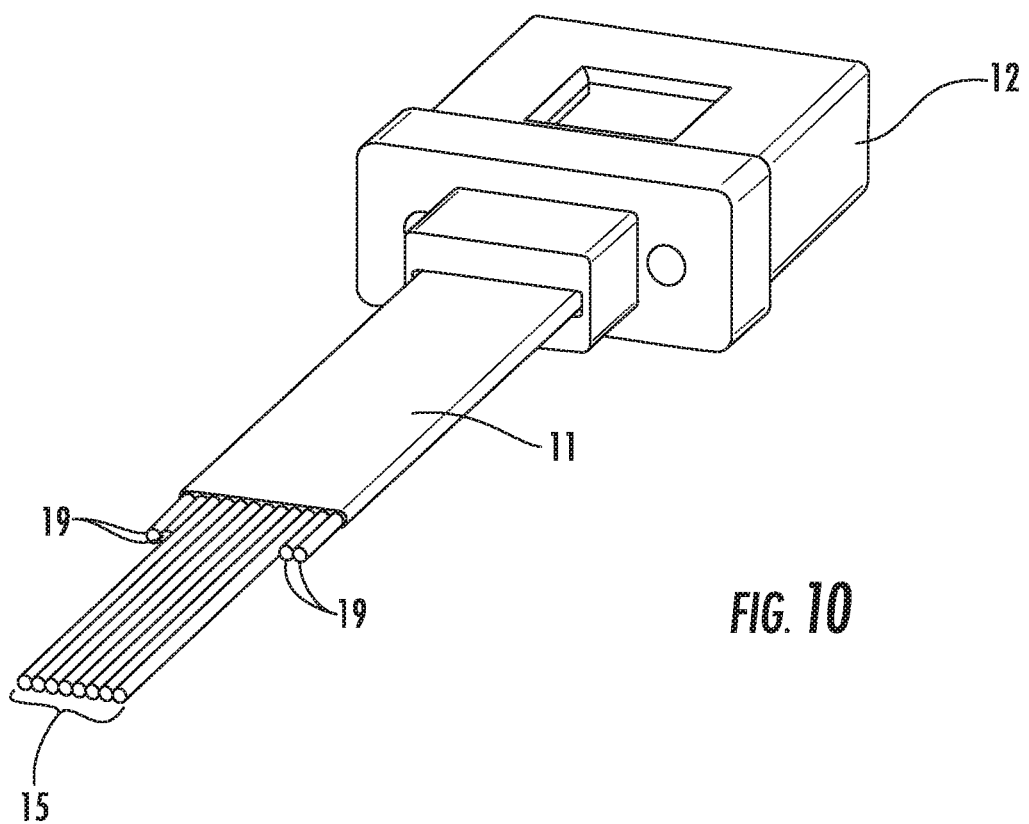
FIG. 10 is a fragmented perspective view of a sixth embodiment of an optical fiber cable assembly.
Figure 11:
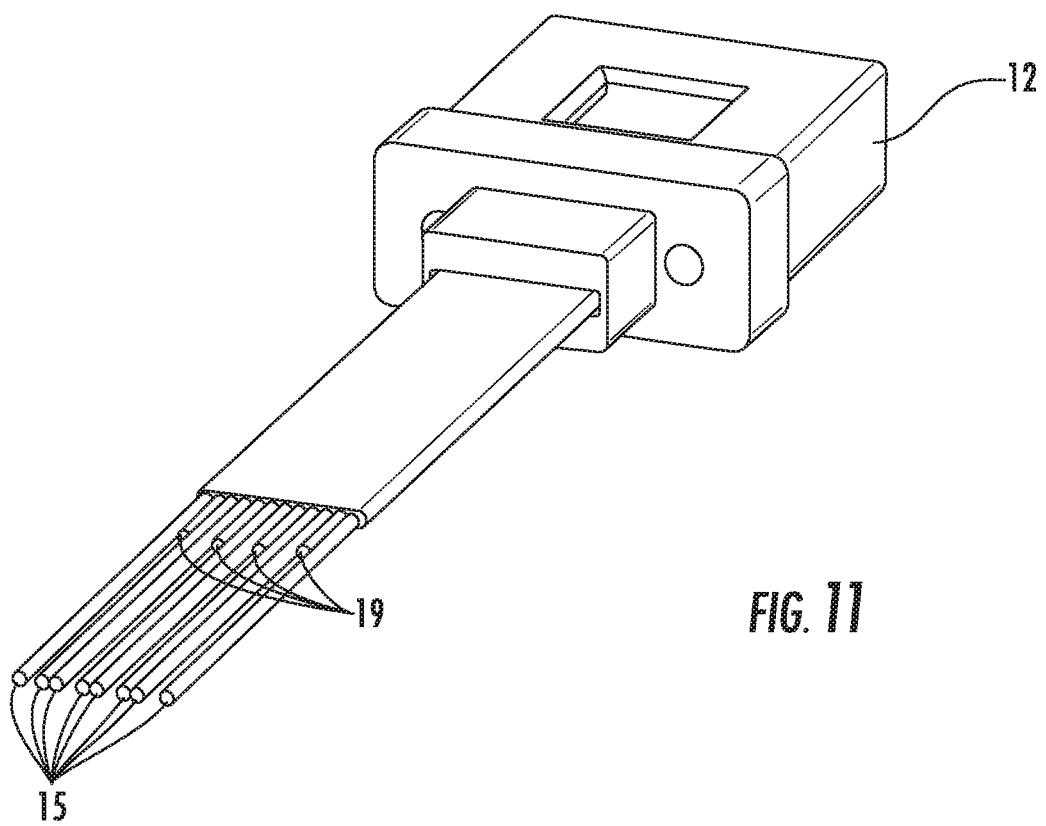
FIG. 11 is a fragmented perspective view of a seventh embodiment of an optical fiber cable assembly.
Figure 12:
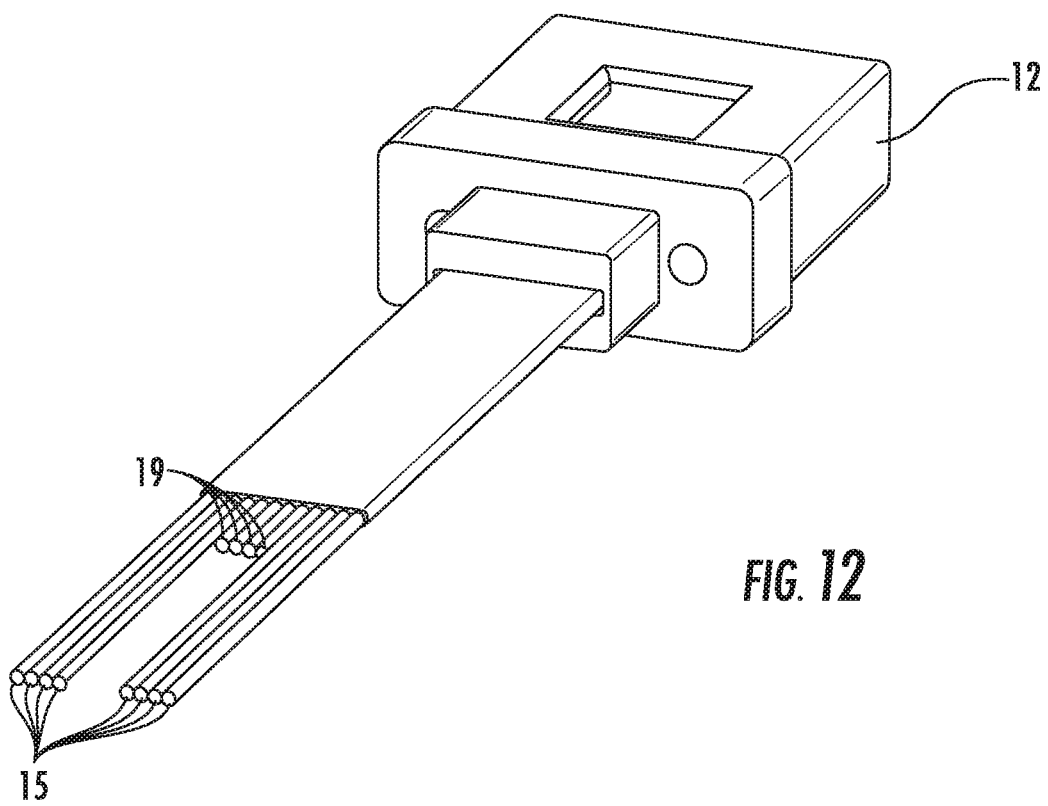
FIG. 12 is a fragmented perspective view of a eighth embodiment of an optical fiber cable assembly.
Figure 13:
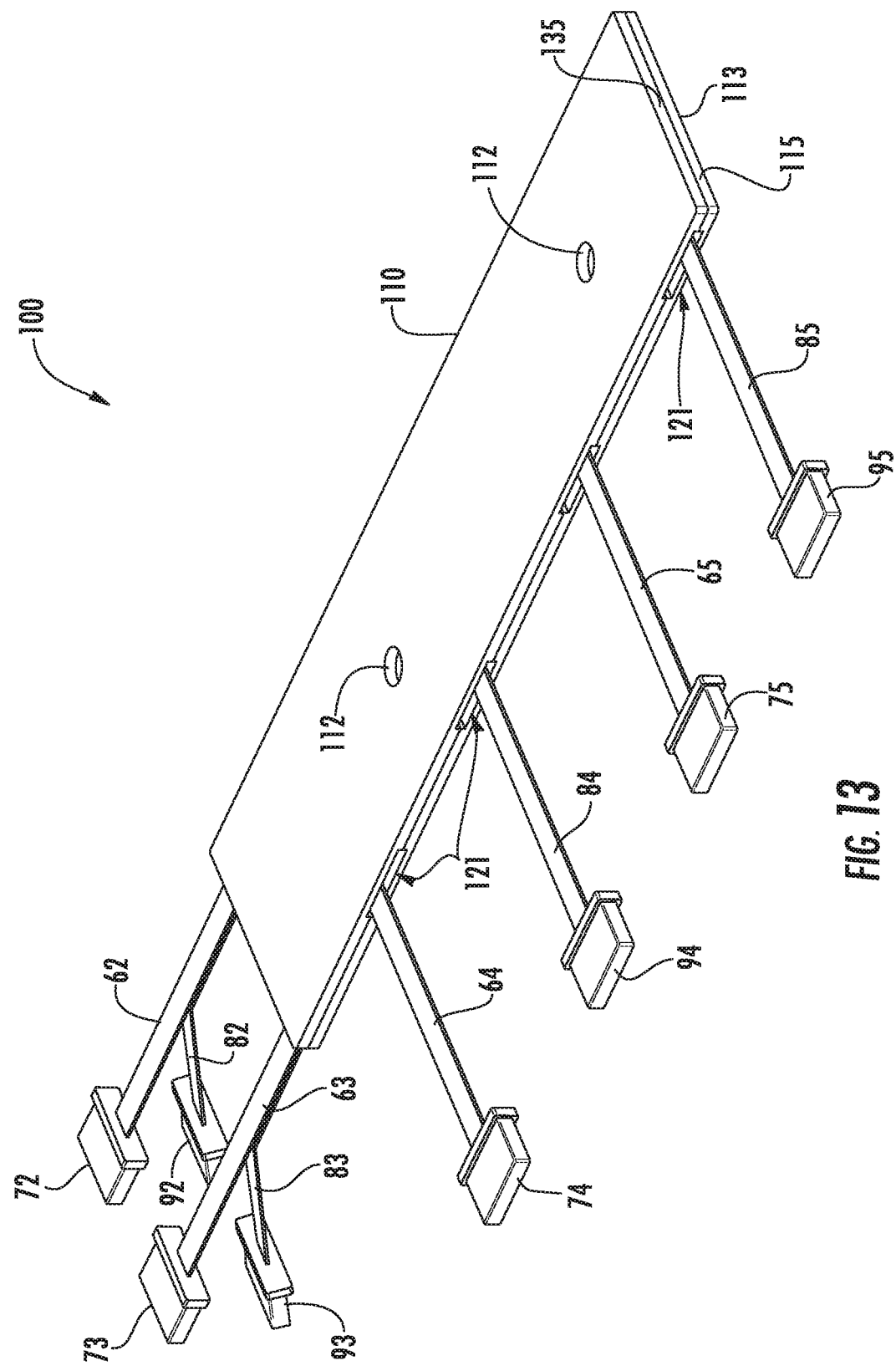
FIG. 13 is a perspective view of an optical fiber assembly.

If desired, the ribbon cables 11, 31, 51 may incorporate dummy optical fibers 16 (FIGS. 10-12) that are utilized to assist in termination of the ribbon cables but are not optically functional as part of the optical fiber cable assemblies 10, 30, 50. More specifically, if an application requires fewer optical fibers 15 than the number of optical fibers that may be terminated in a specific connector, dummy optical fibers 16 may be applied while forming the ribbon cables adjacent the ends of the ribbon cables. In such case, all of the optical fiber receiving receptacles (not shown) of the connectors include an optical fiber therein so that standard optical fiber termination and polishing techniques and fixtures may be utilized. Examples of different configurations of optical fibers 15 and dummy optical fibers 19 terminated within optical fiber connector 12 are depicted in FIGS. 10-12.

Figure 14:
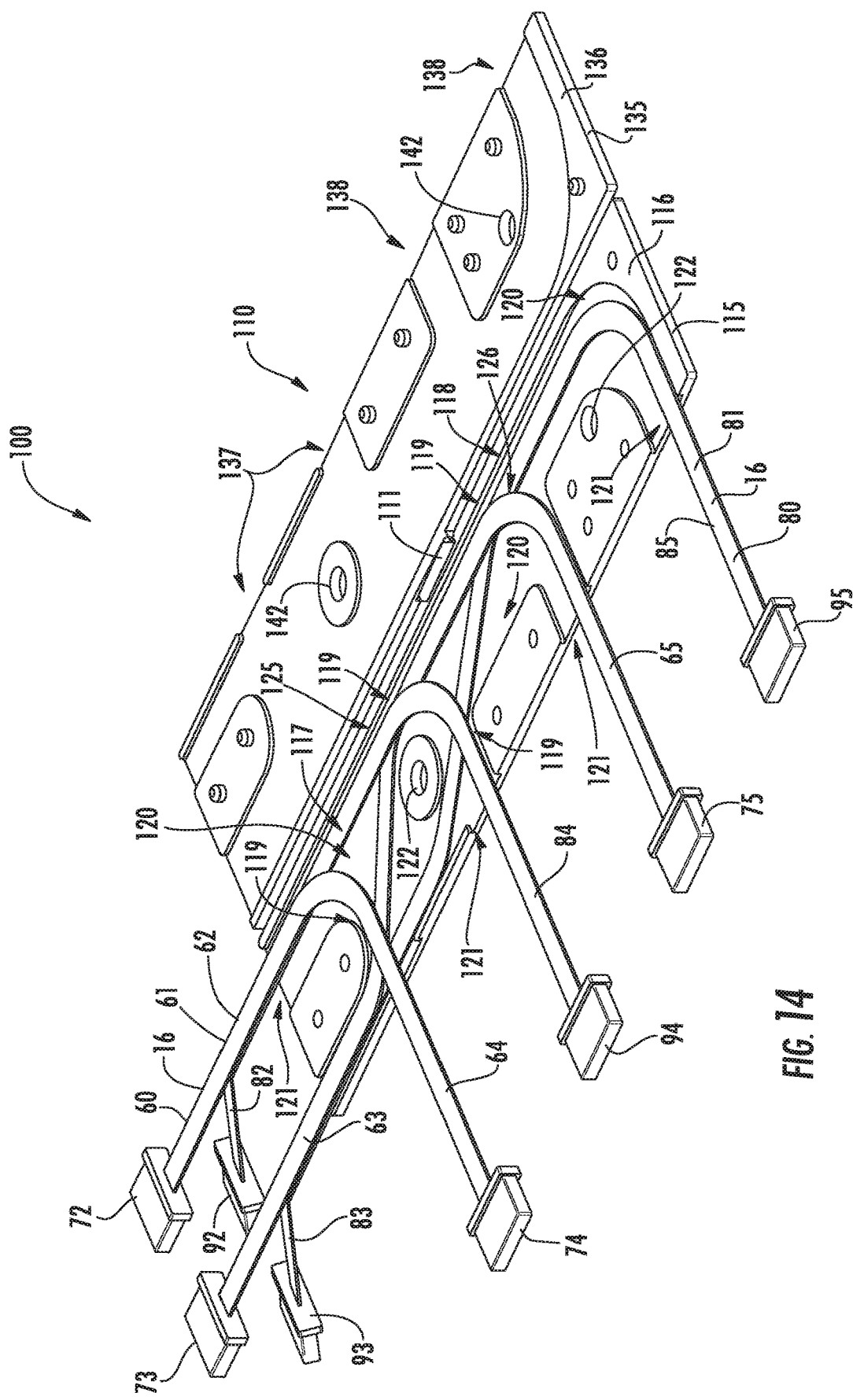
FIG. 14 is a perspective view of the optical fiber assembly of FIG. 13 but with the carrier in an open or loading position.

In some applications, a plurality of optical fiber cable assemblies may be used within a system. In such case, it may be desirable to provide a system or carrier 110 to assist in assembling the system and to organize and manage the position of each of the optical fiber connectors. Referring to FIGS. 13-16, an optical fiber assembly 100 includes a carrier 110 with a plurality of optical fiber cable assemblies such as first optical fiber cable assembly 60 and second optical fiber cable assembly 80 secured or mounted thereon. Carrier 110 is generally planar and includes a first or lower body component 115 and a second or upper body component 135. As depicted, lower body component 115 and upper body component 135 are connected by a hinge 111 (FIG. 14). In an alternate embodiment, the lower and upper body components 115, 135 may be formed as separate elements and subsequently connected.

Optical fiber cable assembly 60 includes a generally planar, flexible ribbon cable 61 formed of a plurality of optical fibers 15 and coated with a coating 16 as described above. As depicted, ribbon cable 61 includes a first leg or portion 62 terminated to a first optical connector 72, a second leg or portion 63 terminated to a second optical connector 73, a third leg or portion 64 terminated to a third optical connector 74, and a fourth leg or portion 65 terminated to a fourth optical connector 75. The first portion 62 is connected to the third portion 64 by curved portion 66 and the second portion 63 is connected to the fourth portion 65 by angled or dog-leg shaped portion 67. Each portion includes one or more optical fibers 15 therein and the optical fibers from each portion 62-65 may be routed to any of the other portions. It should be noted that, as depicted in FIGS. 13-18, the optical fiber cable assemblies 60, 80 may include optical fibers 15 that are bent with radii that exceed desired minimum fiber bending standards. In practice, it is typically desirable to avoid bending an optical fiber 15 to create a radius that is smaller than an acceptable bending standard.

Optical fiber cable assembly 80 includes a generally planar, flexible ribbon cable 81 formed of a plurality of optical fibers 15 and coated with a coating 16 as described above. Ribbon cable 81 includes a first leg or portion 82 terminated to a first optical connector 92, a second leg or portion 83 terminated to a second optical connector 93, a third leg or portion 84 terminated to a third optical connector 94, and a fourth leg or portion 85 terminated to a fourth optical connector 95. As depicted, ribbon cable 81 is configured in a manner similar to the ribbon cable 61 of optical fiber cable assembly 60 except that the first leg or portion 82 and the second leg or portion 83 of the ribbon cable 81 are longer than first and second portions 62, 63 of ribbon cable 61. The first portion 82 is connected to the third portion 84 by curved portion 86 and the second portion 83 is connected to the fourth portion 85 by angled or dog-leg shaped portion 87. Each of the ribbon cable 61 and the ribbon cable 81 may have any desired configuration.

Lower body component 115 of carrier 110 includes a ribbon cable retention surface 116 along which segments of the ribbon cables 61, 81 of the optical fiber cable assemblies 60, 80, respectively are secured. Retention surface 116 may include a plurality of ribbon guide members for in which a portion of the ribbon cables 61, 81 may be received to position the optical connectors 72-75, 92-95 in their desired positions. Ribbon guide members may be configured as recesses or channels 117 to receive segments of the ribbon cable 61 and recesses or channels 118 operative to receive segments of the ribbon cable 81. Although depicted as elongated structures, the recesses 117, 118 may be formed of a plurality of projections that define a path for the ribbon cables 61, 81. If desired, the recesses 117, 188 may have a generally U-shaped cross-section.

In some instances, such as those depicted at 119, segments of ribbon cable 61 and/or segments of ribbon cable 81 may overlap or be vertically aligned. In such case, the recesses 117 and recesses 118 may intersect and overlap and may be configured so that their depth accommodates all or a portion of the segments of the ribbon cables 61, 81 aligned with the channels. Accordingly, in embodiments in which segments of the ribbon cables 61, 81 overlap, the channels may be deeper as compared to a channel that receives a segment from a single ribbon cable. In other embodiments, the depth of each segment of the recesses 117, 118 may depend upon the number and thickness of the segments of the ribbon cables 61, 81 positioned therein.

In some instances, the recesses 117, 118 may be configured or dimensioned to permit portions of the ribbon cables 61, 81 to move within the recesses. Space within the recesses 117, 118 depicted at 120 will permit movement of the ribbon cable that is generally parallel to the axes of the optical fibers 15 along the end of each of the ribbon cables. Space depicted at 121 will permit movement of the ribbon cable generally perpendicular to the axes of the optical fibers along the end of each ribbon cable. In addition, by configuring the depth of each recesses 117, 118, the ribbon cables may also move vertically within the recesses. Movement of the ribbon cables may be desirable to facilitate mating of the optical connectors 72-75, 92-95 with other components (not shown). For example, permitting the movement of the ribbon cables may simplify the assembly process of a system into which the cable assemblies are installed by permitting greater tolerances for the positioning of various components of the system.

Upper body component 135 of carrier 110 may include a securement surface 136 facing or positioned in an opposed relationship with the retention surface 116 of lower body component 115. The securement surface 136 may include portions 137, 138 aligned with the recesses 117, 118, respectively that cooperate with the recesses 117, 118 to enclose or retain the segments of the ribbon cables 61, 81 within the channels. In some embodiments, the portions 137, 138 of securement surface 136 may be recessed to receive portions of the segments of the ribbon cables 61, 81. In other embodiments, the portions 137, 138 may not be recessed. The depth of the recesses 117, 118 may be established or configured based upon the depth (or existence) of recesses along portions 137, 138 of the securement surface 136.

Carrier 110 may include or be associated with one or more mounting structures or members to permit the optical fiber assembly 100 to be mounted to an opto-electronic assembly such as a circuit board or member, which may have optical components mounted thereon. In one embodiment, the mounting structures may be configured as a bore 112 that passes through the lower body component 115 and upper body component 135 to permit a screw, bolt or other fastener to pass through the carrier 110. As depicted, each bore 112 may be formed by a first bore 122 in the lower body component 115 and a second bore 142 in the upper body component 135, which is aligned with the first bore.

The bores 112 may be configured to permit fasteners to pass through the carrier 110 after the ribbon cables 61, 81 are mounted on the carrier and the lower body component 115 and upper body component 135 secured together. In such case, the bores 112 are positioned so that they are not aligned with any portion of the ribbon cables 61, 81. In another embodiment, one or more bores 112 in the lower body component 115 may be aligned with portions of the ribbon cable 61, 81. In such case, a fastener (not shown) is inserted into each bore 112 prior to insertion of the ribbon cable 61, 81 and a bore is not required in the upper body component 135. Other types of mounting members such as attachment projections that extend from a mounting side 113 of the carrier 110 opposite the retention surface 116 are contemplated.

Carrier 110 may include a latching structure to secure the lower body component 115 and upper body component 135 together. As depicted, the latching structure includes lower latching members 119 located on the retention surface 116 of the lower body component 115 and upper latching members 139 located on the securement surface 136 of the upper body component 135 and aligned with the lower latching members. In one embodiment, the latching structure including a plurality of snap latches with each lower latching member 119 includes a plurality of bores 120 and each upper latching member 139 includes a like number of projections or posts 140 dimensioned and positioned to be lockingly received within an aligned bore upon positioning the lower body component 115 and upper body component 135 in a locked position.

Figure 15:
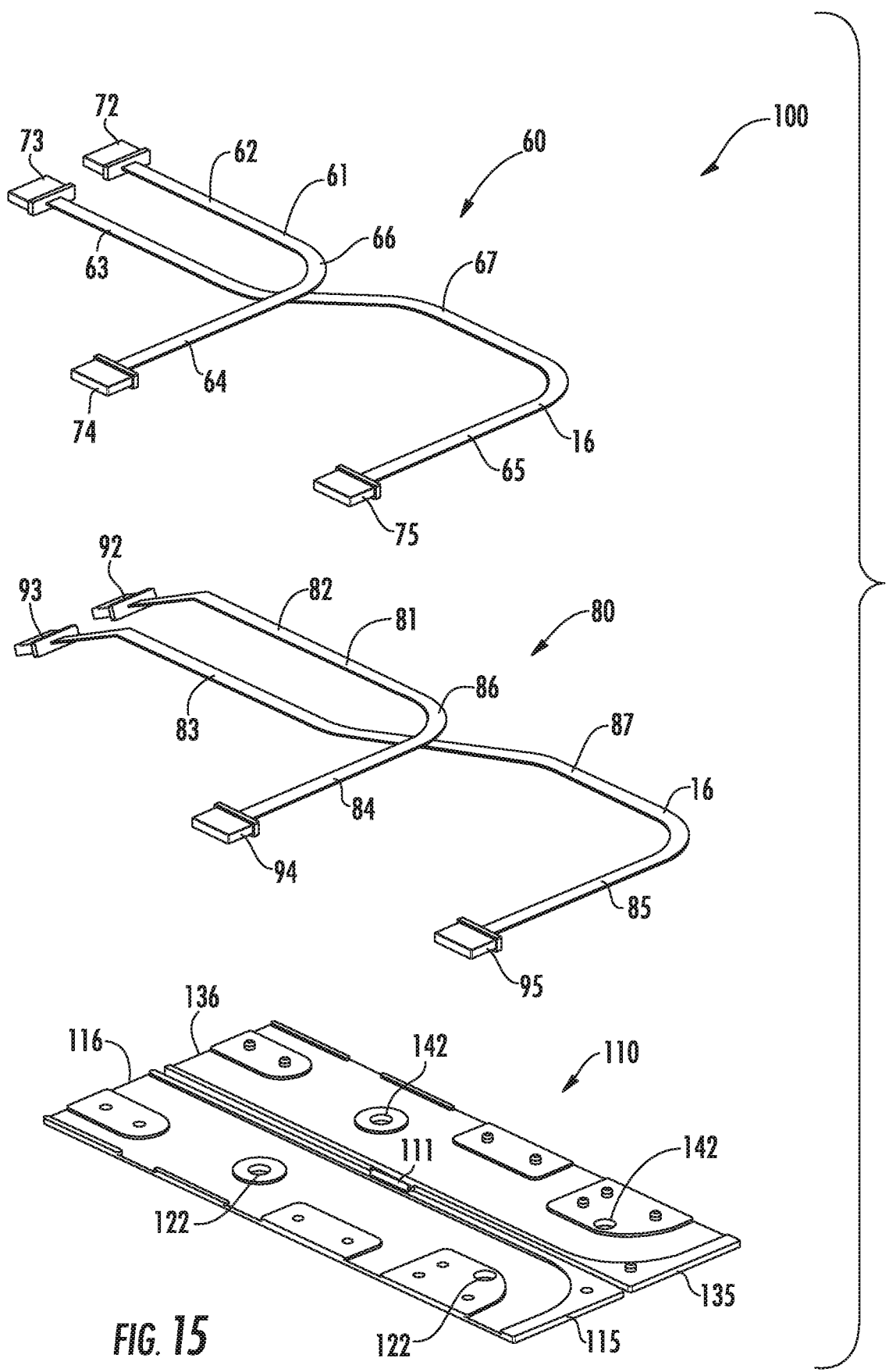
FIG. 15 is an exploded perspective view of the optical fiber assembly of FIG. 14.
Figure 16:
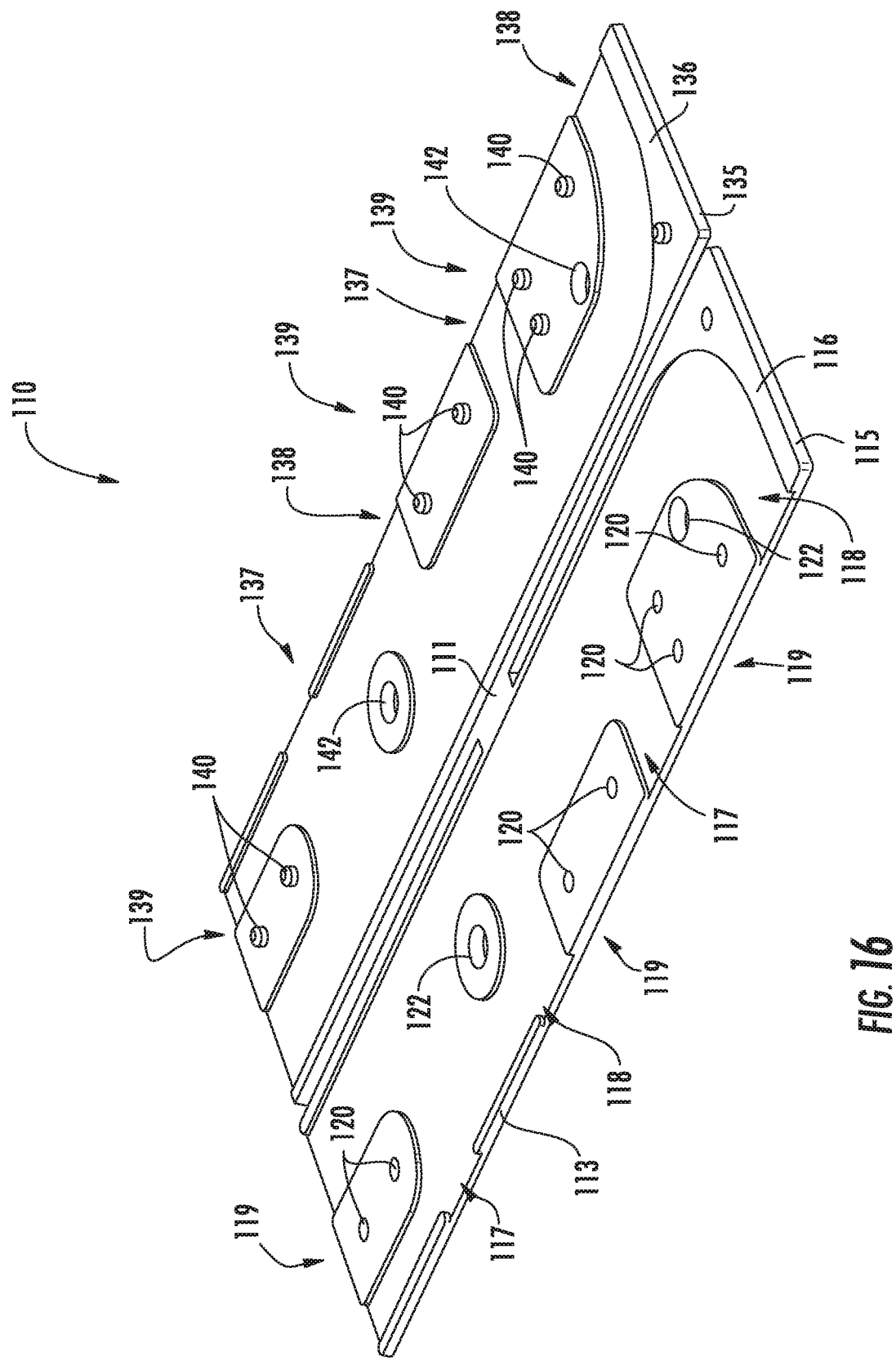
FIG. 16 is an enlarged perspective view of the carrier of FIG. 15.
Figure 17:
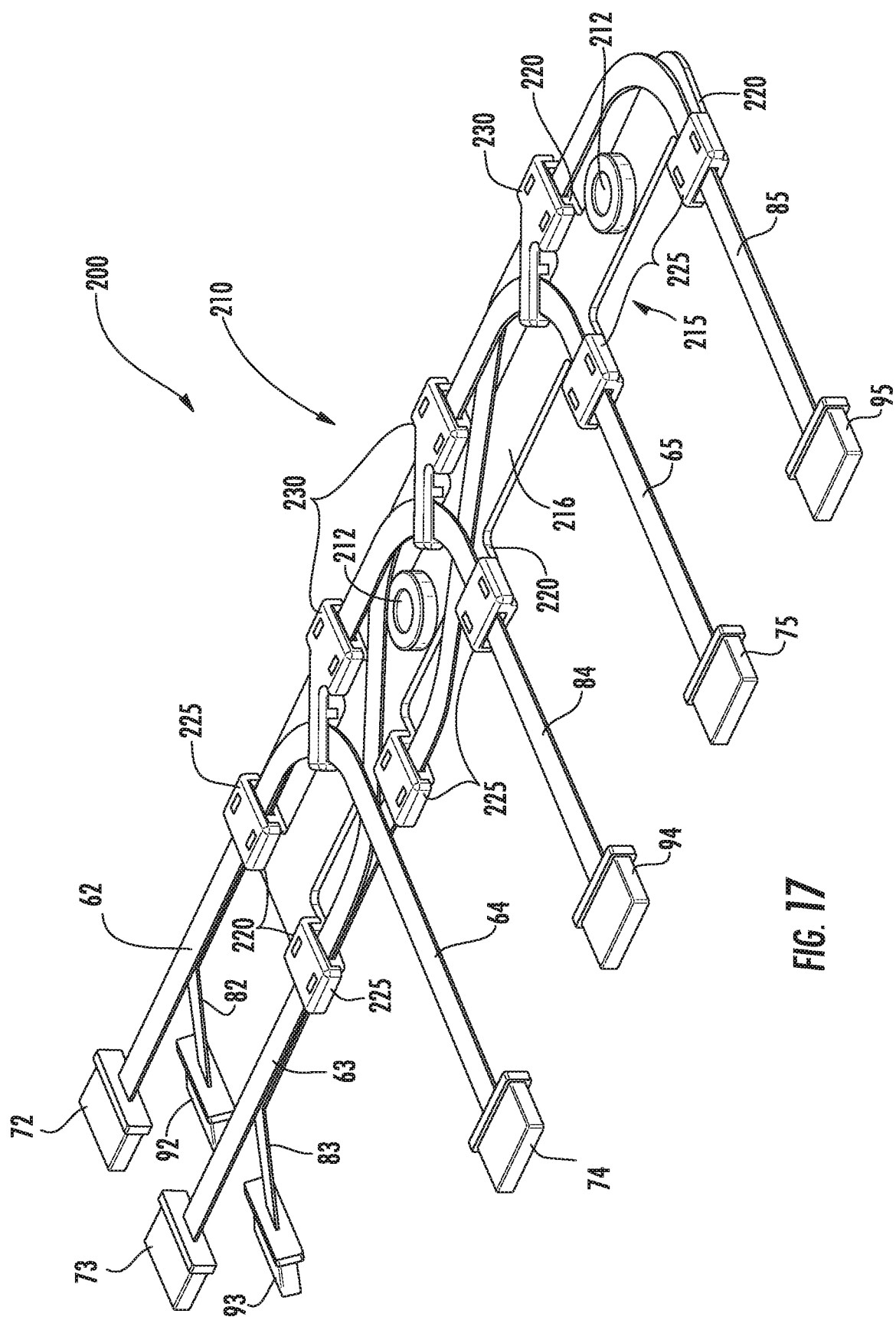
FIG. 17 is a perspective view of a second embodiment of an optical fiber assembly.
Figure 18:
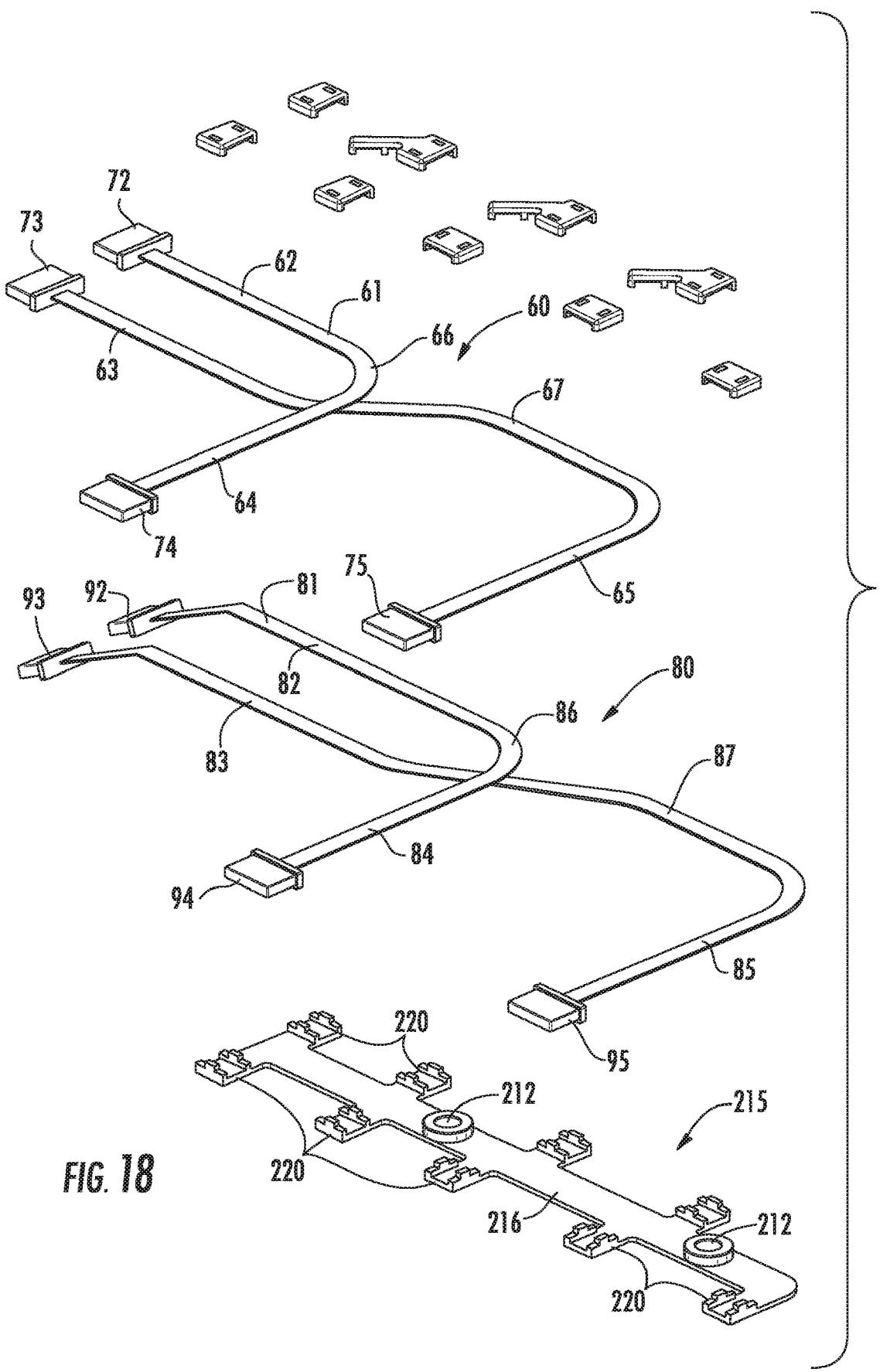
FIG. 18 is an exploded perspective view of the optical fiber assembly of FIG. 17.

To assemble optical fiber assembly 100, the ribbon cables 61, 81 are aligned with and inserted into their respective recesses 117, 118 that extend along the retention surface 116 of lower body component 115. The segments of the ribbon cables 61, 81 may be inserted in any desired sequence. As depicted in FIG. 14-15, the first and second portions 82, 83 of the ribbon cable 81 are positioned below the first and second portions 62, 63 of the ribbon cable 61 (i.e., further within the recesses). Angled portion 67 of ribbon cable 61 passes under curved portion 86 of ribbon cable 81 at 125 and passes over the angled portion 87 of ribbon cable 81 at 126.

After the ribbon cables 61, 81 have been inserted into their respective recesses 117, 118, the upper body component 135 may be reoriented or rotated relative to the lower body component 115 so that the retention surface 116 of the lower body component is in proximity to and opposing the securement surface 136 of the upper body component. The lower body component 115 and the upper body component 116 are positioned so that each post 140 projecting from the securement surface 136 is aligned with one of the bores 120 in the retention surface 116. Additional relative movement between the lower body component 116 and the upper body component 135 will force the posts 140 into their respective bores 120 to secure the lower body component and the upper body component together. Fasteners (not shown) may be inserted through bores 112 that extend through the carrier 110 and secured to an assembly such as an opto-electronic circuit board or member (not shown).

In embodiments in which the hinge 111 is omitted from the carrier 110, retention surface 116 of the lower body component 115 and the securement surface 136 of the upper body component 135 may be positioned adjacent each other without relative rotational movement of the lower and upper body components.

Figure 19:
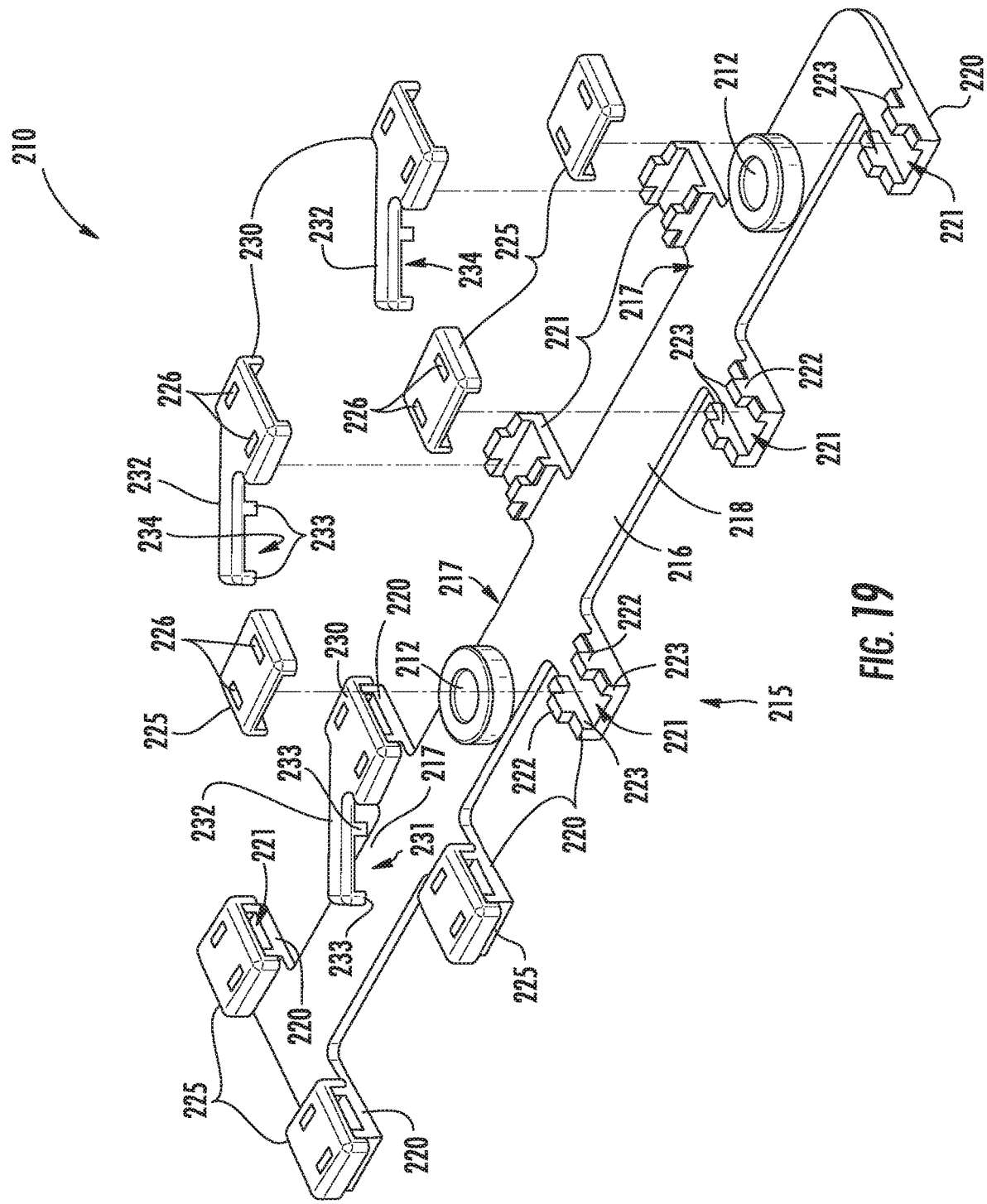
FIG. 19 is an enlarged partially exploded perspective view of the carrier of FIG. 17.

In some applications, additional airflow may be required within the operating environment in which an optical fiber assembly (such as that depicted at 100 in FIGS. 13-16) is being used. In such case, referring to FIGS. 17-19, it may be desirable to utilize a carrier 210 upon which first optical fiber cable assembly 60 and second optical fiber cable assembly 80 are mounted to form optical fiber assembly 200. Optical fiber assembly 200 will permit greater airflow through an operating environment as compared to the optical fiber assembly 100. Optical fiber cable assemblies 60, 80 may be identical to those described above with respect to FIGS. 13-16 and the descriptions thereof are not repeated. The ribbon cables 61, 81 of optical fiber cable assemblies 60, 80 are mounted generally along a retention surface 217 of the support member 215.

Carrier 210 is generally planar and includes an elongated support member 215 having a main body 216 with a plurality of support arms 220 that extend laterally from the main body. Each support arm 220 is within the plane of the main body 216 and includes a ribbon guide member in the form of a pair of walls or projections 223 that define a channel or recess 221 configured to receive a portion of one of the first optical fiber cable assembly 60 or the second optical fiber cable assembly 80. A cap or cover 225 is attached or connected to each support arm 220 to cover or close the channel 221.

Each support arm 220 and each cover 225 may include a locking structure to lockingly secure the cover to the support arm once a portion of a ribbon cable 61, 81 has been inserted into channel 221. As depicted, latching projections 222 extend upward from the projections 223 on opposite sides of the channels 221. Openings 226 extend through each cover 225 to lockingly receive the projections 222 therein. Other locking structures are contemplated. For example, channel 221 may be formed by a plurality of posts (not shown) that project upward from the support arms 220 and each cover may include a plurality of bores for lockingly receiving the posts therein. In such case, the posts may serve a dual purpose of defining the channels 221 to receive the ribbon cable 61, 81 and forming a portion of the locking structure to secure the covers 225 to the support arms 220.

While the channels 221 and covers 225 fully encircle portions of the first optical fiber cable assembly 60 or the second optical fiber cable assembly 80, it is not necessary to fully encircle the cable assemblies provided that the cable assemblies are secured to the support arms 220. Accordingly, other types of securement members and structures are contemplated.

If desired, one or more alternate embodiments of cover 230 may be connected to the support arms 220. Cover 230 may be similar or identical to cover 225 but further include additional components to form additional channels or recesses 231. For example, the cover 230 includes an arm 232 with a pair of downwardly depending projections or ribs 233. The pair of projections 233 are spaced apart to define a channel 234 to receive a portion of a ribbon cable 61, 81 therein. The channel 234 interacts with a portion 217 of the carrier 210 to encircle a portion of the ribbon cables 61, 81. As a result, each cover 230 interacts with a support arm 220 as well as a portion 217 of main body 216 to form a plurality of channels 221, 234 to increase the locations at which the optical fiber cable assemblies 60, 80 may be supported.

Carrier 210 may include or be associated with one or more mounting structures or members to permit the optical fiber assembly 200 to be mounted to an opto-electronic assembly such as a circuit board or member, which may have optical components mounted thereon. In one embodiment, the mounting structure may be configured as a bore 212 that passes through the main body 216 to permit a screw, bolt or other fastener to pass through the carrier. Other types of mounting members such as attachment projections that extend from a mounting side of the carrier 210 opposite the retention surface 218 are contemplated.

Assembly of the optical fiber assembly 200 is similar to that of optical fiber assembly 100 in that each of the optical fiber cable assemblies 60, 80 are aligned with and inserted into the respective channels 221 that extend along the support arms 220 of support member 215. The segments of the ribbon cables 61, 81 may be inserted in any desired sequence into the channels 221. After the ribbon cables 61, 81 have been inserted into their respective channels 221, the covers 225 may be mounted on the support arms to capture the ribbon cables in the channels. If the second embodiment of covers 230 are being used, the channels 234 are aligned with portions of the ribbon cables 61, 81 as the covers are mounted on the support arms 220. After the optical fiber assembly 200 has been assembled, fasteners (not shown) may be inserted through bores 212 that extend through the carrier 210 and secured to an assembly such as an opto-electronic circuit board or member (not shown).

Figure 20:
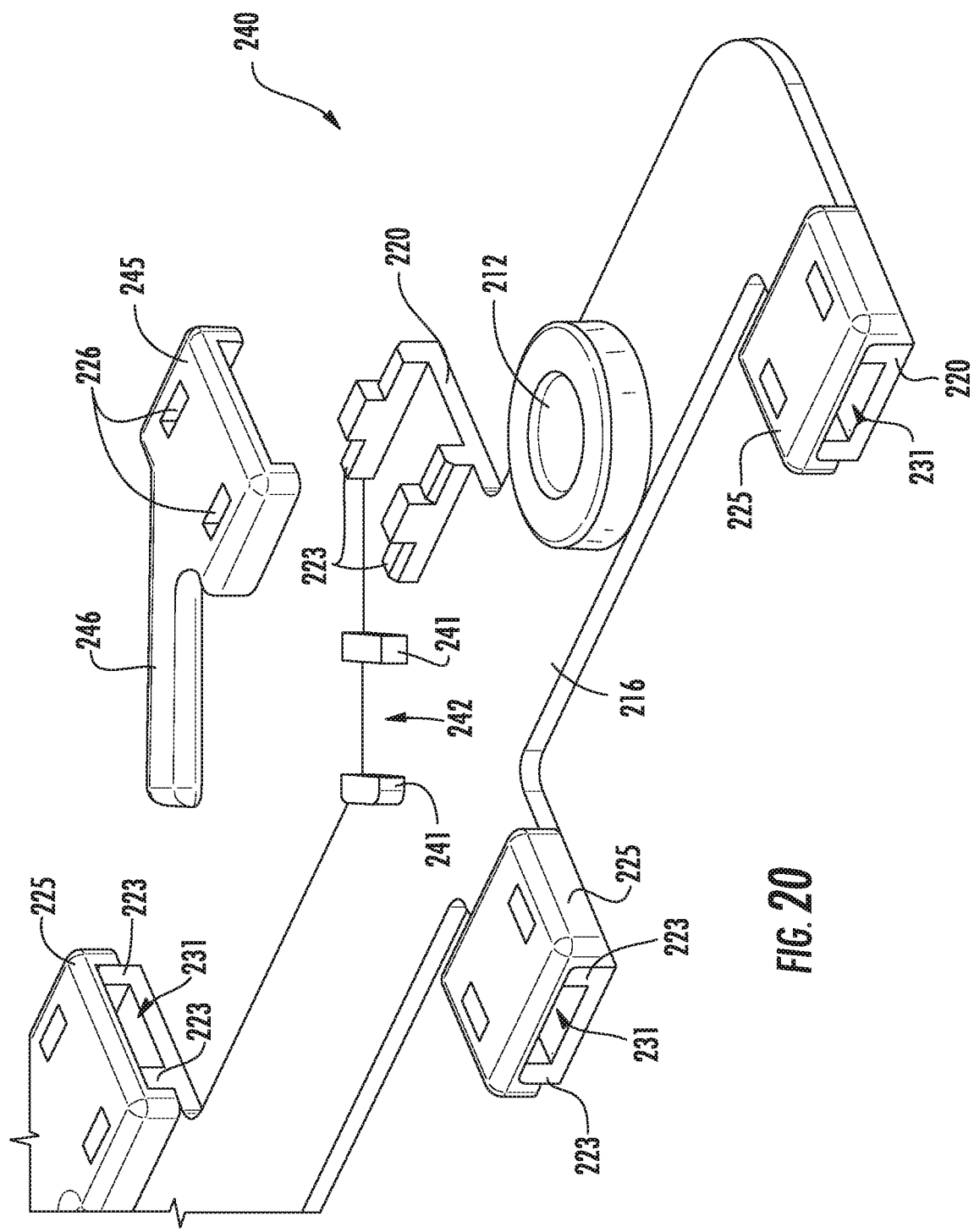
FIG. 20 is an enlarged partially exploded perspective view of an alternate embodiment of a carrier.

Referring to FIG. 20, an alternate embodiment of a carrier 240 and cover 245 combination is depicted. In such embodiment, carrier 240 includes projections 241 extending upward from the main body 216 to form a second channel 242. An arm 246 extends from cover 245 and interacts with the projections 241 to encircle a portion of ribbon cables 61, 81. If desired, a portion (not shown) of the projections 241 may extend into openings (not shown) in the arm 246.

Although optical fiber assembly 100 and optical fiber assembly 200 are each depicted with two optical fiber cable assemblies 60, 80 each having six optical connectors, the cable assemblies may have any form and any number of connectors. The carriers 110, 210 may be configured to receive and support the optical fiber cable assemblies in any desired manner.

Referring to FIG. 21, an alternate embodiment of an optical fiber assembly 300 is depicted with a carrier 310 configured to receive and support a first cable assembly 350 and a second cable assembly 360. The first cable assembly 350 includes a first ribbon cable 351 with an optical connector 355 terminated to optical fibers at each end 352 of the second ribbon cable. The second cable assembly 360 includes a second ribbon cable 361 with an optical connector 365 terminated to optical fibers at each end 362 of the second ribbon cable.

The carrier 310 is generally similar to carrier 110 except that it is configured to receive the first and second ribbon cables 351, 352 therein. The carrier 310 includes a lower body component 315 and an upper body component 335 interconnected by a hinge 311. The lower body component 315 includes a ribbon cable retention surface 316 with recesses or channels 317 therein to receive the first optical fiber cable assembly 350 and recesses or channels 318 to receive the second optical fiber cable assembly 360 therein. The upper body component 335 includes a securement surface 336 that interacts with the retention surface 316 to secure the ribbon cables 351, 361 within the carrier 310. As depicted, the securement surface 336 is generally planar.

Carrier 310 includes a bore defined by a first bore 322 in the lower body component 315 and a second bore 342 in the upper body component 335 that is aligned with the first bore when the lower body component 315 and the upper body component 335 are assembled together. The carrier 310 further includes latching structures in the form of bores 320 in the lower body component and posts 340 extending from the securement surface 336 of the upper body component 335. The posts 340 are dimensioned and positioned to be lockingly received within an aligned bore 320 upon positioning the lower body component 335 and the upper body component 335 in a locked position.

The carriers 110, 210, 310 may be formed of any desired material. In one embodiment, the carriers 110, 210, 310 may be formed of a molded resin or polymer material.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An optical fiber cable assembly comprising:
   a plurality of optical fibers, the plurality of optical fibers having a length, each optical fiber having a first end portion and a second end portion, the first end portion of each of the plurality of optical fibers being positioned in a generally parallel first array, the second end portion of each of the plurality of optical fibers being positioned in a generally parallel second array; and
   a coating applied to at least a section of each optical fiber, and the optical fibers along a portion of the length spaced from the first and second end portions not being retained in a parallel array;
   wherein each of the plurality of optical fibers includes an exposed flexible portion without the coating thereon, the exposed flexible portion being spaced from the first and second end portions, and
   wherein the exposed flexible portion includes a shuffle portion where at least one of the plurality of optical fibers crossing over another of the plurality of optical fibers so that a sequence of optical fibers at the first end does not match the sequence of optical fibers at the second end.

2. The optical fiber assembly of claim 1, wherein the coating encapsulates an entire length of each of the plurality of optical fibers between the first and second end portions.

3. The optical fiber assembly of claim 1, wherein at least one of the first and second end portions includes an angled edge, the angled edge being at an angle to axes of the optical fibers adjacent the at least one of the first and second end portions.

4. The optical fiber assembly of claim 1, wherein the angle is between approximately 30 degrees and 60 degrees.

5. The optical fiber assembly of claim 1, wherein each of the first and second end portions includes an angled edge, the angled edge being at an angle to axes of the optical fibers adjacent respective first and second end portions.

6. The optical fiber assembly of claim 1, further including a second plurality of optical fibers, a third plurality of optical fibers and a fourth plurality of optical fibers, a first optical connector, a second optical connector, and a third optical connector, the plurality of optical fibers and the second plurality of optical fibers being terminated to the first connector, the third plurality of optical fibers and the fourth plurality of optical fibers being terminated to the second connector, and the plurality of optical fibers and the third plurality of optical fibers being terminated to the third connector, at least a length of each of the second plurality of optical fibers, the third plurality of optical fibers and the fourth plurality of optical fibers being encapsulated by the coating.

7. The optical fiber assembly of claim 6, wherein the first end of the plurality of optical fibers and a first end of the second plurality of optical fibers are generally parallel, a first end of the third plurality of optical fibers and a first end of the fourth plurality of optical fibers are generally parallel, and a second end of the first plurality of optical fibers and a second end of the third plurality of optical fibers are generally parallel.

8. An optical fiber assembly comprising:
a first cable assembly including a plurality of first optical fibers with a plurality of first optical fiber connectors terminated to the plurality of first optical fibers;
a second cable assembly including a plurality of second optical fibers with a plurality of second optical fiber connectors terminated to the plurality of second optical fibers;
a generally planar carrier with at least one first guide member and at least one second guide member, the first cable assembly being secured to the carrier with a portion of the first cable assembly disposed within the at least one first guide member, the plurality of first optical fiber connectors being spaced from the carrier, and the second cable assembly being secured to the carrier with a portion of the second cable assembly disposed within the at least one second guide member, the plurality of second optical fiber connectors being spaced from the carrier;
a securement structure operatively associated with each first guide member and each second guide member, the retention structure being operative to retain the portion of the first cable assembly within the first guide member and retain the portion of the second cable assembly within the second guide member, wherein the carrier includes a body component with a retention surface having a plurality of channels, each channel comprising one of the guide members; and
further including a second body component, the second body component including a securement surface facing and disposed adjacent the retention surface to retain the portion of the first cable assembly within the first guide member and the portion of the second cable assembly within the second guide member.

9. The optical fiber assembly of claim 8, wherein the generally planar carrier includes a plurality of first guide members and a plurality of second guide members.

10. The optical fiber assembly of claim 8, wherein the first and second guide members are recesses in a retention surface of the generally planar carrier.

11. The optical fiber assembly of claim 8, wherein each guide member at least partially encircles a portion of one of the cable assemblies to secure the cable assembly to the carrier.

12. The optical fiber assembly of claim 11, wherein each guide member has a generally U-shaped cross-section.

13. The optical fiber assembly of claim 8, wherein the carrier includes at least one mounting member to facilitate mounting the carrier to an optical assembly, the mounting member being accessible while the first cable assembly and the second cable assembly are secured to the carrier.

14. The optical fiber assembly of claim 8, wherein the carrier includes a body comprising a first component and a second component secured to the first component, a portion of the first cable assembly and the second cable assembly being secured between the first component and the second component of the carrier.

15. The optical fiber assembly of claim 8, wherein each cable assembly includes a first portion and a second portion, each of the first portion and the second portion extending from the carrier along an axis, the first portion and the second end portion each being movable relative to the carrier along its axis.

16. The optical fiber assembly of claim 8, wherein the carrier includes an elongated body with a plurality of support arms extending therefrom, each support arm including a guide member thereon.

* * * * *